(12) United States Patent
Medda et al.

(10) Patent No.: US 11,215,118 B2
(45) Date of Patent: Jan. 4, 2022

(54) AIRCRAFT PROPULSION SYSTEM INCLUDING A HEAT EXCHANGER SYSTEM

(71) Applicants: Airbus (S.A.S.), Blagnac (FR); Airbus Operations (S.A.S.), Toulouse (FR); Airbus Operations, S.L., Madrid (ES)

(72) Inventors: Bruno Medda, Tournefeuille (FR); Thomas Stevens, Tournefeuille (FR); Julien Cayssials, Gagnac sur Garonne (FR); Adeline Soulie, Verdun sur Garonne (FR); Didier Poirier, Blagnac (FR); Pierre-Alain Pinault, Tournefeuille (FR); Esteban Martino González, Aranjuez (ES); Juan Tomas Prieto Padilla, Getafe (ES); Diego Barron Vega, Madrid (FR)

(73) Assignees: Airbus (S.A.S.), Blagnac (FR); Airbus Operations (S.A.S.), Toulouse (FR); Airbus Operations, S.L., Madrid (ES)

( * ) Notice: Subject to any disclaimer, the term of this patent is extended or adjusted under 35 U.S.C. 154(b) by 158 days.

(21) Appl. No.: 16/712,232

(22) Filed: Dec. 12, 2019

(65) Prior Publication Data
US 2020/0191056 A1    Jun. 18, 2020

(30) Foreign Application Priority Data
Dec. 14, 2018  (EP) .................... 18306695

(51) Int. Cl.
*F02C 7/10*  (2006.01)
*B64D 27/18*  (2006.01)
(Continued)

(52) U.S. Cl.
CPC ............... *F02C 7/10* (2013.01); *B64D 27/18* (2013.01); *B64D 29/02* (2013.01); *B64D 33/04* (2013.01);
(Continued)

(58) Field of Classification Search
CPC .... F02C 7/047; F02C 7/10; F02C 7/14; F02C 7/185; F02C 6/08; B64D 27/18;
(Continued)

(56) References Cited

U.S. PATENT DOCUMENTS

| | | |
|---|---|---|
| 6,134,880 A | 10/2000 | Yoshinaka |
| 6,364,007 B1 | 4/2002 | Fischer |

(Continued)

FOREIGN PATENT DOCUMENTS

| | | |
|---|---|---|
| FR | 2 889 298 A1 | 2/2007 |
| WO | WO 2007/034050 A1 | 3/2007 |

OTHER PUBLICATIONS

European Search Report for Application No. 18306695.0 dated Jul. 8, 2019.

*Primary Examiner* — Jesse S Bogue
*Assistant Examiner* — Loren C Edwards
(74) *Attorney, Agent, or Firm* — Jenkins, Wilson, Taylor & Hunt, P.A.

(57) ABSTRACT

An aircraft propulsion system including a turbojet and heat exchanger system including a heat exchanger. A supply connection and evacuation connection are forward, and aft are a transfer connection and a scoop connection, a supply pipe connected to the supply connection, and which bleeds hot air from the compression stages. A transfer pipe connected to the transfer connection transfers hot air to an air management system. A scoop connected to a scoop connection bleeds cold air from a fan duct and an evacuation pipe, including an inlet connected to the evacuation connection and an outlet, which emerges on the outside, where hot air through the heat exchanger from the supply pipe to the transfer pipe passes along a first transfer direction and cold air passes through the heat exchanger from each scoop to the
(Continued)

inlet along a second transfer direction parallel to the first transfer direction in the opposite direction.

10 Claims, 4 Drawing Sheets

(51) Int. Cl.
    *B64D 29/02*     (2006.01)
    *B64D 33/04*     (2006.01)
    *F02C 7/047*     (2006.01)
    *F02C 6/08*     (2006.01)
    *F02C 7/14*     (2006.01)
    *B64D 13/06*     (2006.01)

(52) U.S. Cl.
    CPC .............. *F02C 6/08* (2013.01); *F02C 7/047* (2013.01); *F02C 7/14* (2013.01); *B64D 2013/0607* (2013.01); *F05D 2220/323* (2013.01); *F05D 2260/213* (2013.01)

(58) Field of Classification Search
    CPC ........ B64D 29/02; B64D 33/04; B64D 13/06; B64D 2013/0607; B64D 2013/0618; B64D 13/08; B64D 15/04; F05D 2220/323; F05D 2260/213; F28D 21/0003; F28D 21/0014; F28D 2021/0021
    See application file for complete search history.

(56) References Cited

U.S. PATENT DOCUMENTS

| | | |
|---|---|---|
| 7,856,824 B2 | 12/2010 | Anderson et al. |
| 7,926,261 B2 | 4/2011 | Porte |
| 8,161,755 B2 | 4/2012 | Marche |
| 2014/0369812 A1* | 12/2014 | Caruel .................. B64D 33/02 415/116 |

\* cited by examiner

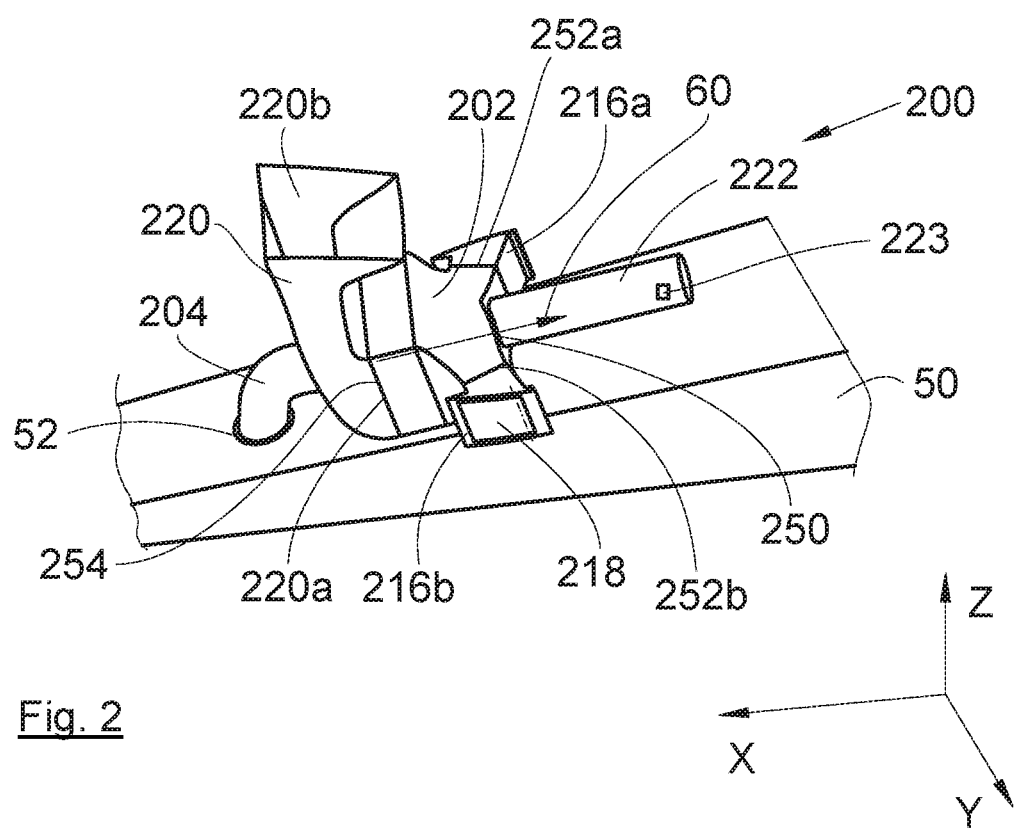
Fig. 2
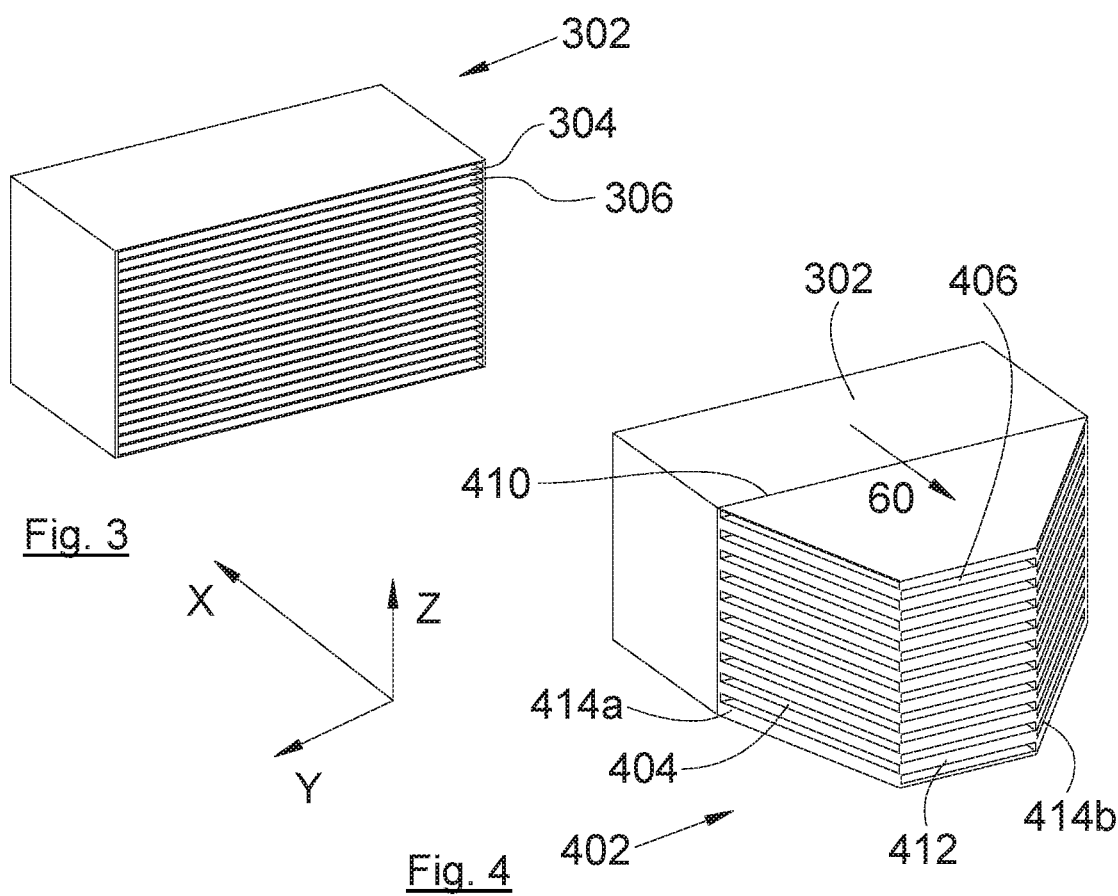
Fig. 3
Fig. 4

AIRCRAFT PROPULSION SYSTEM INCLUDING A HEAT EXCHANGER SYSTEM

CROSS-REFERENCE TO RELATED APPLICATION

This application claims the benefit of and priority to European patent application 18 306695-0 filed on Dec. 14, 2018, the entire disclosure of which is incorporated by reference herein.

TECHNICAL FIELD

The disclosure herein relates to an aircraft propulsion system including a heat exchanger system, together with an aircraft including at least one such propulsion system.

BACKGROUND

In order to supply hot air whether for a system of air, conditioned so as to guarantee the comfort of the passengers, or for a de-icing system for de-icing the outside surfaces of an aircraft, this system includes a heat exchanger system, which is schematically illustrated in FIG. 8.

The heat exchanger system 500 is disposed in the vicinity of the turbojet of the aircraft and it includes a heat exchanger 502.

The heat exchanger 502 is supplied with hot air through a first supply pipe 504, which bleeds hot air from the high pressure stage 506 or at the intermediate pressure stage 508 of the turbojet, respectively through a first valve 510 and a second valve 512. The first supply pipe 504 also includes a regulating valve 514, which enables regulation of the pressure at the inlet of the heat exchanger 502.

The heat exchanger 502 is supplied with cold air by a second supply pipe 516, which bleeds cold air from the fan duct of the turbojet. The second supply pipe 516 also includes a regulating valve 518, which regulates the quantity of cold air introduced into the heat exchanger 502 so as to regulate the temperature of the hot air exiting the heat exchanger 502.

After having passed through the heat exchanger 502, the cold air, which has been heated, is expelled to the outside through an evacuation pipe 520.

After having passed through the heat exchanger 502, the hot air, which has been cooled, is directed through a transfer pipe 522 to the air management systems like the air conditioning system or the de-icing system.

The heat exchanger system 500 includes a temperature sensor 523, which measures the temperature of the hot air exiting the heat exchanger 502 and a control unit 524, which controls the valves according to the temperature measured by the temperature sensor 523 and the temperature desired for the hot air exiting the heat exchanger 502.

The heat exchanger 502 is with cross flow, that is to say that the hot air and the cold air enter the heat exchanger 502 and exit the heat exchanger 502 along two globally perpendicular directions.

Although such a heat exchanger system 500 gives good results, it is relatively bulky because of the crossed directions of the entering and exiting airflows.

SUMMARY

An aim of the disclosure herein is to propose an aircraft propulsion system including a heat exchanger system, which is less bulky and thus enables better integration in the propulsion system.

To that effect, an aircraft propulsion system is disclosed herein.

The implementation of counter-current flows enables a reduction of bulkiness and hence better integration.

BRIEF DESCRIPTION OF THE DRAWINGS

The aforementioned characteristics of the disclosure herein, as well as others, will emerge more clearly on reading the following description of an embodiment example, the description being made in relation to the attached drawings, among which:

FIG. 2 is a perspective view of a heat exchanger system according to the disclosure herein;

FIG. 3 is a perspective view of a first stage of a heat exchanger of the heat exchanger system according to the disclosure herein;

FIG. 4 is a perspective view of a second stage of a heat exchanger of the heat exchanger system according to the disclosure herein;

DETAILED DESCRIPTION

Figure 1:
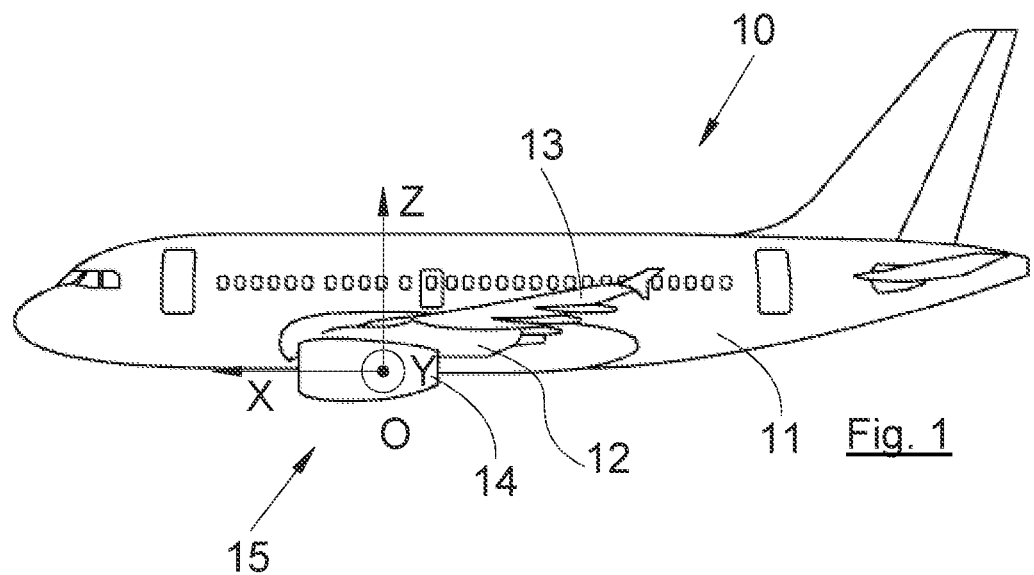
FIG. 1 is a side view of an aircraft including a heat exchanger system according to the disclosure herein.
Figure 8:
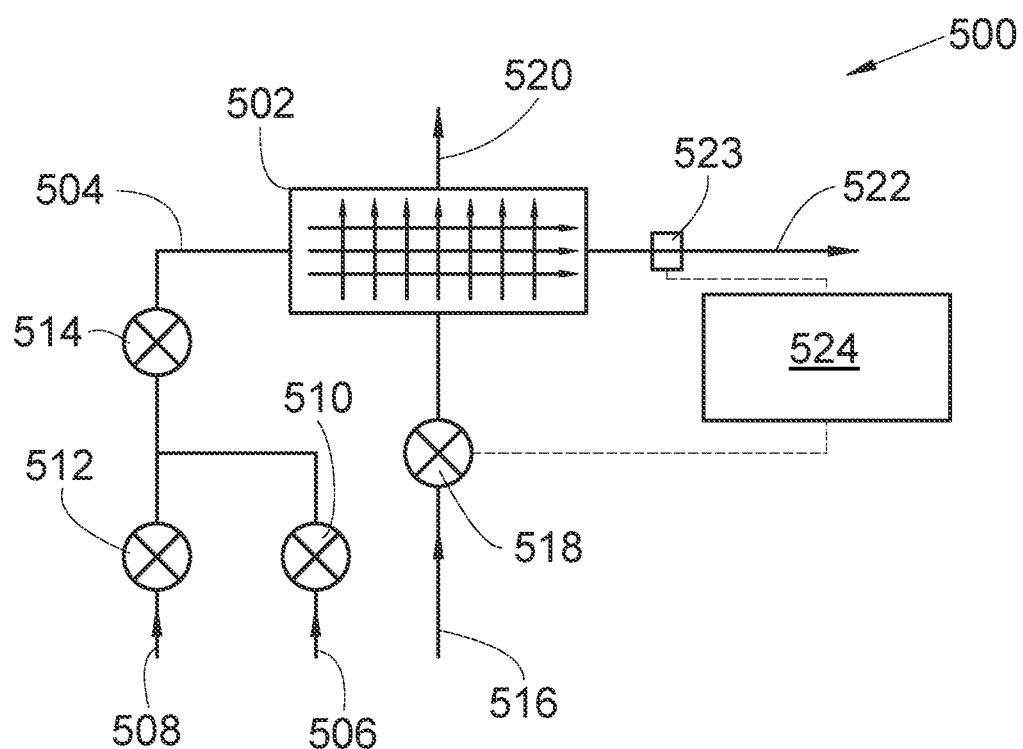
FIG. 8 is a schematic illustration of a heat exchanger system of the state of the art.

In the description that follows, the terms relating to a position are taken with reference to an aircraft in normal flight position, that is to say, as it is illustrated on FIG. 1 and the positions "forward" and "aft" are taken in relation to the front and rear of the turbojet.

In the description that follows, and by convention, X is the longitudinal axis of the turbojet, which is parallel to the longitudinal axis of the aircraft, Y is the transversal axis, which is horizontal when the aircraft is on the ground, and Z is the vertical axis, which is vertical when the aircraft is on the ground, these three directions X, Y and Z being orthogonal to each other.

FIG. 1 shows an aircraft 10, which includes a fuselage 11, on either side of which a wing 13 is fastened that supports at least one propulsion system 15, which includes a pylon 12 and a turbojet 70 (FIG. 7), The pylon 12 is fastened under the wing 13 and supports the turbojet 70, which conventionally includes compression stages 72 and a fan duct 74. The pylon 12 includes a primary structure (50, FIG. 2), which is fastened at its upper part to the structure of the wing 13 and which supports the turbojet through different fastening points. The primary structure 50 is disposed above the turbojet 70 and its front edge is attached to the turbojet 70 inside the fan duct 74.

The aircraft 10 includes an air management system like for example an air conditioning system and/or a de-icing system.

The propulsion system 15 also includes a nacelle 14, which includes a fairing 76, which surrounds the turbojet 70, and an aerodynamic fairing of the pylon 12, which surrounds the primary structure 50.

Figure 7:
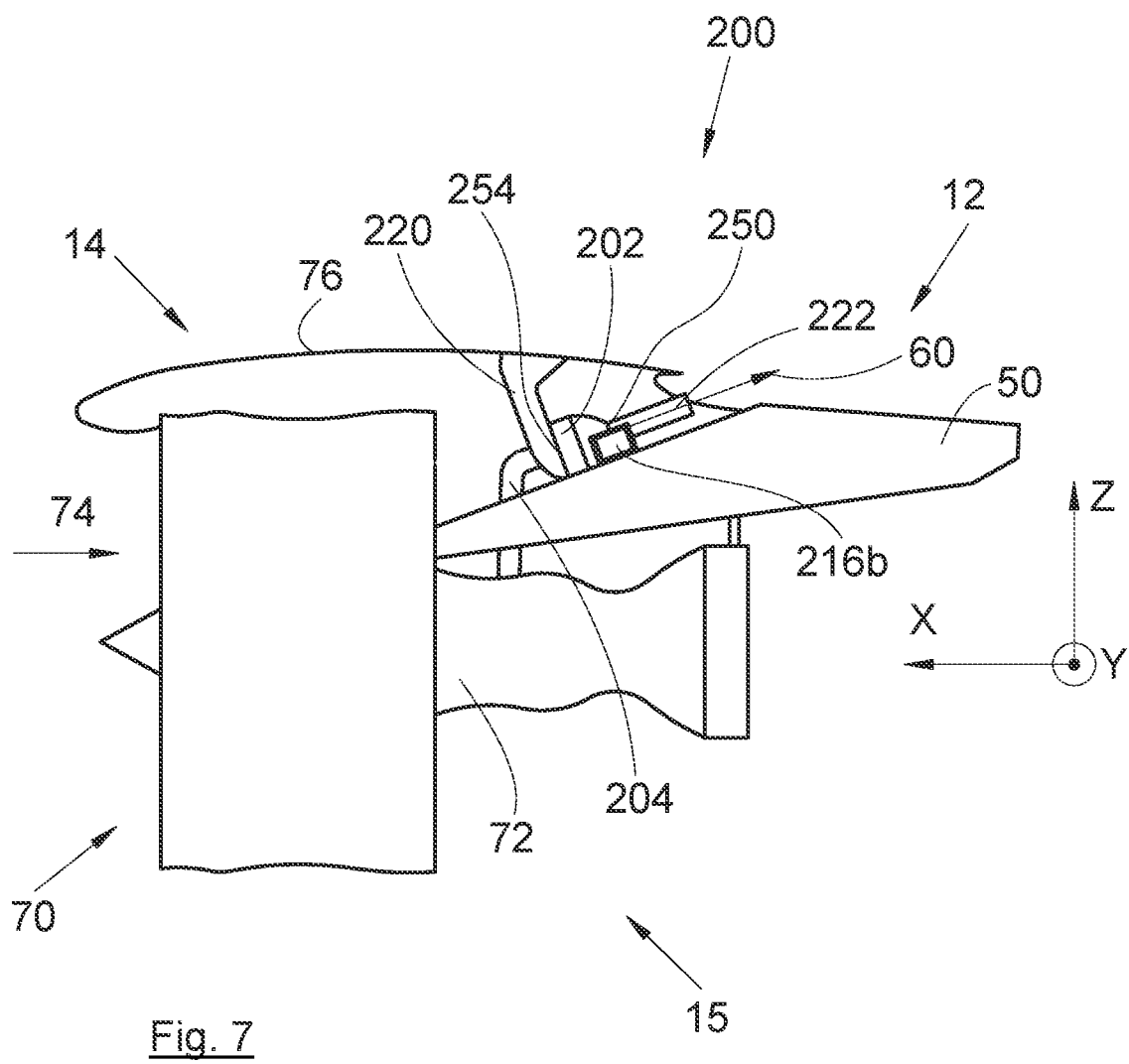
FIG. 7 shows a side view of the heat exchanger system in its environment.

FIG. 2 shows a heat exchanger system 200 of the propulsion system 15, which is located on the primary structure 50 and in the fan duct 74. FIG. 7 shows the exchanger system 200 in its environment.

The heat exchanger system 200 includes a heat exchanger 202, which is fastened above the primary structure 50 and which includes a supply connection disposed forward of the heat exchanger 202, a transfer connection 250 disposed aft of the heat exchanger 202, at least one scoop connection 252a-b disposed aft of the heat exchanger 202 and an evacuation connection 254 disposed forward of the heat exchanger 202.

The supply connection and the transfer connection 250 are pneumatically connected through the heat exchanger 202. Each scoop connection 252a-b and the evacuation connection 254 are pneumatically connected through the heat exchanger 202.

The heat exchanger system 200 includes a supply pipe 204, pneumatically connected to the supply connection and which bleeds hot air from the compression stages 72 of the turbojet 70 and supplies the heat exchanger 202 with the hot air bled in this way.

The heat exchanger system 200 includes a transfer pipe 222, which is pneumatically connected to the transfer connection 250 and which transfers the hot air, which was cooled on passing through the heat exchanger 202, to the air management system of the aircraft 10.

The passage of the hot air through the heat exchanger 202 from the supply pipe 204 to the transfer pipe 222 takes place along a first transfer direction 60, which here is globally parallel to the longitudinal axis X and is here oriented from forward to aft.

For each scoop connection 252a-b, the heat exchanger system 200 includes a scoop 216a-b, which is pneumatically connected to the scoop connection 252a-b and which bleeds cold air from the fan duct and supplies the heat exchanger 202 with the cold air bled in this way.

The heat exchanger system 200 includes an evacuation pipe 220, which includes an inlet 220a pneumatically connected to the evacuation connection 254. The evacuation pipe 220 also includes an outlet 220b, which emerges on the outside through an opening in the fairing of the nacelle 14 or of the pylon 12.

Thus, after having passed through the heat exchanger 202, the cold air, which was heated is expelled to the outside by the evacuation pipe 220 through the fairing 76.

Each scoop 216a-b is thus disposed aft of the heat exchanger 202, that is to say, towards the transfer pipe 222. In the embodiment of the disclosure herein presented on FIG. 2, there are two scoops 216a-b placed to port and starboard of the transfer pipe 222.

The passage of the cold air through the heat exchanger 202 from each scoop 216a-b to the inlet 220a takes place along a second transfer direction parallel to the first transfer direction 60, but is oriented in the opposite direction, i.e. here from aft to forward.

The heat exchanger 202 therefore has a counter-current flow, that is to say that the hot air and the cold air enter the heat exchanger 202 and exit the heat exchanger 202 parallel to the same first transfer direction 60, but in opposite directions.

Such an arrangement allows space to be gained above the primary structure 50. More specifically, thanks to the use of counterflow heat transfer which is more efficient than a crossflow heat transfer, a more compact heat exchanger is obtained, the heat exchanger can be installed closer to the pylon.

Each scoop 216a-b includes a door 218, which is mobile between an open position in which it does not blank off the scoop 216a-b and a closed position in which it blanks off the scoop 216a-b so as to regulate the quantity of cold air captured by the scoop 216a-b and therefore introduced into the heat exchanger 202 in order to regulate the temperature of the hot air exiting the heat exchanger 202. Each door 218 is motorized so as to ensure its movement. Each scoop 216a-b is oriented so as to be able to capture the cold air that circulates in the fan duct.

In the embodiment of the disclosure herein presented on FIG. 2, the primary structure 50 includes a window 52 through which the supply pipe 204 is mounted between the turbojet, which is below the primary structure 50 and the heat exchanger 202, which is above.

As in the state of the art, the propulsion system 15 includes valves at the supply pipe 204 and a temperature sensor 223, which measure the temperature of the hot air exiting the heat exchanger 202.

The doors 218, which are motorized, act as the regulating valve 518 for the state of the art.

The propulsion system 15 includes a control unit, which controls the valves and the motors of the doors 218 according to the temperature measured by the temperature sensor 223 and the temperature desired for the hot air exiting the heat exchanger 202.

In the embodiment of the disclosure herein presented on FIG. 2, the outlet 220b is oriented upwards relative to the inlet 220a.

FIG. 3 shows a first stage 302 of the heat exchanger 202 and FIG. 4 shows a second stage 402 of the heat exchanger 202, and which is positioned aft of the first stage 302.

The first stage 302 is a box in which first cold channels 304 and first hot channels 306 are placed. In the same way, the second stage 402 is a box in which second cold channels 404 and second hot channels 406 are placed. The first stage 302 and the second stage 402 are made of materials having a high heat transfer coefficient, such as metal for example. For each stage 302, 402, the cold channels 304, 404 and the hot channels 306, 406 are preferably interposed, that is to say that a cold channel 304, 404 is disposed between two hot channels 306, 406, and vice-versa.

Aft of the first stage 302, and therefore forward of the second stage 402, the first hot channels 306 and the second hot channels 406 are pneumatically connected together and are extended. Forward of the first stage 302, the first hot channels 306 are pneumatically connected to the supply connection. Aft of the second stage 402, the second hot channels 406 are pneumatically connected to the transfer connection 250. The first hot channels 306 and the second hot channels 406 thus enable the hot air issuing from the supply pipe 204 to flow to the transfer pipe 222 through the heat exchanger 202.

Aft of the first stage 302, and therefore forward of the second stage 402, the first cold channels 304 and the second cold channels 404 are pneumatically connected together and are extended. Forward of the first stage 302, the first cold channels 304 are pneumatically connected to the evacuation connection 254. Aft of the second stage 402, the second cold channels 404 are pneumatically connected to each scoop connection 252a-b. The first cold channels 304 and the second cold channels 404 thus enable the cold air issuing from the fan duct and the scoops 216a-b to flow to the evacuation pipe 220 through the heat exchanger 202.

The first stage 302 has the shape of a parallelepiped rectangle.

Each of the first cold channels 304 and each of the first hot channels 306 extend along the first transfer direction 60.

Each of the second hot channels 406 extends along the first transfer direction 60.

The second stage 402 has the shape of a truncated pyramid, which has a large base 410 and a small base 412 perpendicular to the first transfer direction 60 and which has two sides 414a-b inclined between the large base 410 and the small base 412.

The large base 410 constitutes the junction zone between the first stage 302 and the second stage 402, where the second hot channels 406 and the second cold channels 404 emerge.

The small base 412 constitutes the zone where only the second hot channels 406 emerge and where the junction is made with the transfer connection 250. The second cold channels 404 are blanked off at the small base 412.

Each side 414a-b constitutes the zone where only the second cold channels 404 emerge and where the junction is made with one of the two scoop connections 252a-b. The second hot channels 406 are blanked off at each side 414a-b.

Figure 5:
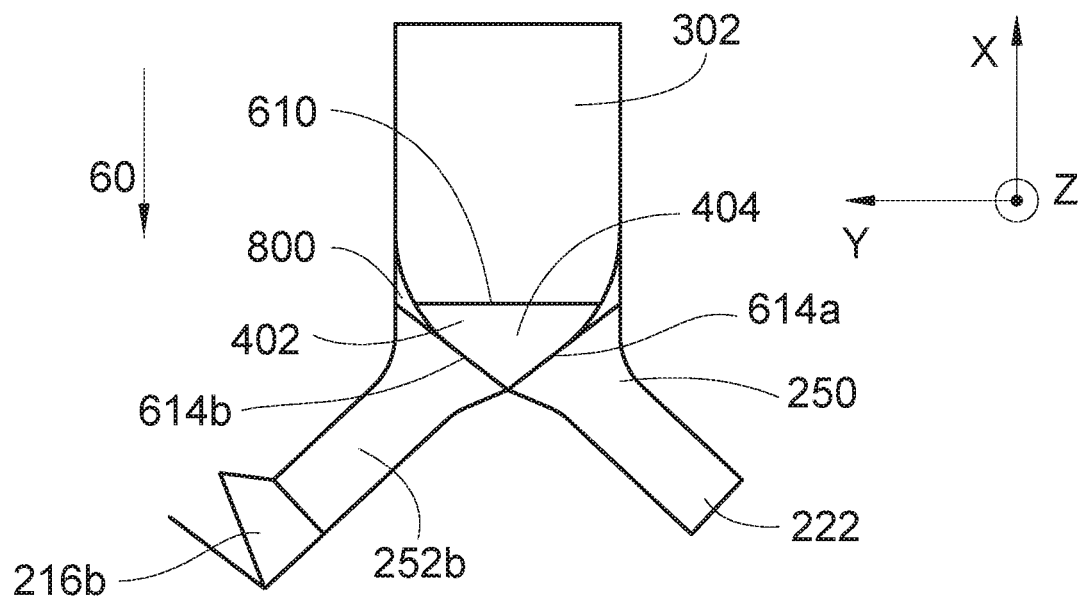
FIG. 5 shows a top view of an exchanger according to a particular embodiment.

FIG. 5 shows a top view of a section passing through a second cold channel 404 and in the embodiment of FIG. 5, there is a single scoop 216b and a single scoop connection 252b. The second stage 402 has the shape of a two-sided pyramid, which has a base 610 perpendicular to the first transfer direction 60 and two sides 614a-b inclined from the base 610.

The base 610 constitutes the junction zone between the first stage 302 and the second stage 402 where the second hot channels 406 and the second cold channels 404 emerge.

One of the sides 614b constitutes the zone where only the second cold channels 404 emerge and where the junction is made with the scoop connection 252b. The second hot channels 406 are blanked off at the side 614b.

The other side 614a constitutes the zone where only the second hot channels 406 emerge (not seen on FIG. 5) and where the junction is made with the transfer connection 250. The second cold channels 404 are blanked off at the side 614a.

At the junction with the heat exchanger 202, each pipe opens out.

Figure 6:
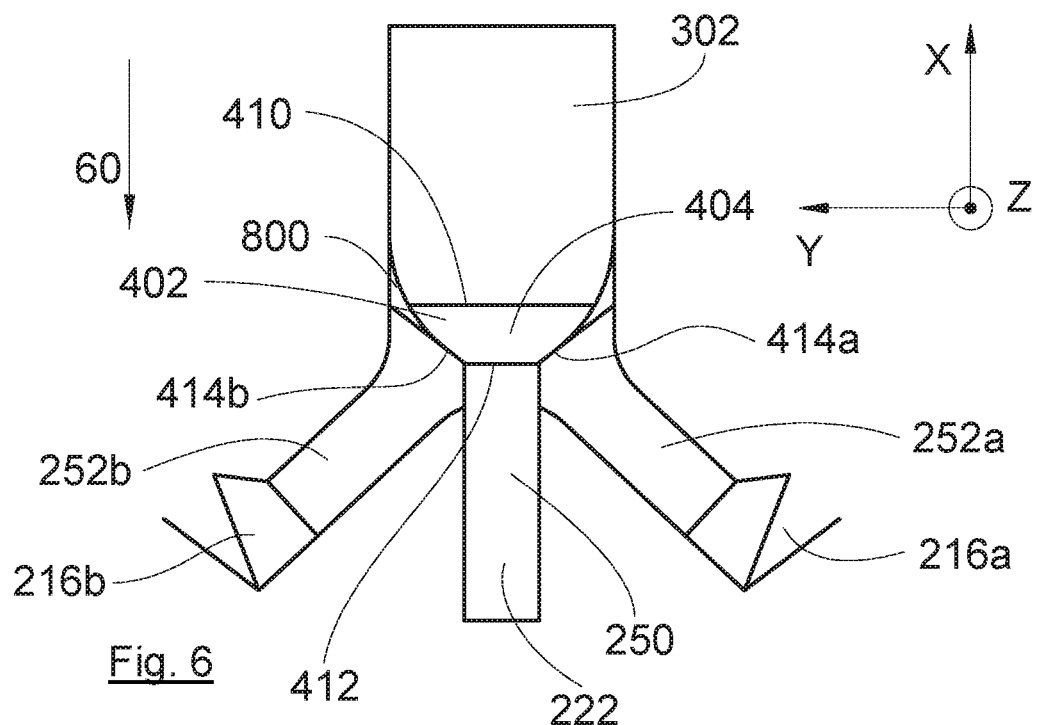
FIG. 6 shows a top view of an exchanger according to another particular embodiment.

FIG. 6 shows a top view of a section passing through a second cold channel 404 and in the embodiment of FIG. 6, there are two scoops 216a-b and two scoop connections 252a-b, and FIG. 6 repeats the embodiment of FIG. 4.

So as to limit pressure loss at the moment the air passes from a pipe to the heat exchanger or from the heat exchanger to a pipe, at the inlet of each second cold channel 404 and at the outlet of each second hot channel 406, the heat exchanger has at least one deflector element 800, which creates suitable guidance of the flow.

In the description below, the heat exchanger is above the primary structure 50 and the direction of the hot air through the heat exchanger 202 is from forward to aft, but in another embodiment, the exchanger is below the primary structure and the hot air is going from aft to forward and the cold air is going from forward to aft. This embodiment is particularly useful when the primary structure 50 is disposed above the turbojet 70 and its front edge is attached above the fan duct 74.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, the propulsion system including a turbojet including a plurality of compression stages and a fan duct, and a heat exchanger system, which comprises:
   a heat exchanger fastened in the fan duct and including a supply connection, a transfer connection disposed aft of the heat exchanger and pneumatically connected to the supply connection through the heat exchanger, at least one scoop connection and an evacuation connection pneumatically connected to each scoop connection of the at least one scoop connection through the heat exchanger;
   a supply pipe connected to the supply connection and configured to bleed a hot air from the compression stages and supply the heat exchanger with the bled hot air;
   a transfer pipe connected to the transfer connection for transferring hot air that has passed through the heat exchanger to an air management system of the aircraft;
   for each scoop connection of the at least one scoop connection, a scoop, which is connected to the scoop connection and which is configured to bleed a cold air from the fan duct and supply the heat exchanger with the bled cold air; and
   an evacuation pipe, which includes an inlet connected to the evacuation connection and an outlet, which emerges outside;
   wherein passage of hot air through the heat exchanger from the supply pipe to the transfer pipe can be along a first transfer direction and passage of the bled cold air through the heat exchanger from each scoop to the inlet can be along a second transfer direction parallel to the first transfer direction but in an opposite direction, and
   wherein the supply connection is disposed forward of the heat exchanger, the at least one scoop connection is disposed aft of the heat exchanger, and the evacuation connection is disposed forward of the heat exchanger.

2. The propulsion system according to claim 1, comprising a pylon with a primary structure, which supports the turbojet, wherein the heat exchanger is fastened above the primary structure and wherein the primary structure includes a window through which the supply pipe is assembled between the turbojet and the heat exchanger.

3. The propulsion system according to claim 2, wherein the bled hot air through the heat exchanger from the supply pipe to the transfer pipe goes from forward to aft, and the bled cold air through the heat exchanger from each scoop to the inlet goes from aft to forward.

4. The propulsion system according to claim 1, comprising a pylon with a primary structure, which supports the turbojet and wherein the heat exchanger is fastened below the primary structure.

5. The propulsion system according to claim 4, wherein the bled hot air through the heat exchanger from the supply pipe to the transfer pipe goes from aft to forward, and the bled cold air through the heat exchanger from each scoop to the inlet goes from forward to aft.

6. The propulsion system according to claim 1, wherein each scoop includes a door which is mobile between an open position in which the door does not blank off the scoop and a closed position in which the door blanks off the scoop.

7. The propulsion system according to claim 1, wherein the heat exchanger includes a first stage and a second stage disposed aft of the first stage, a plurality of first cold channels and a plurality of first hot channels are configured to be placed in the first stage, a plurality of second cold channels and a plurality of second hot channels are configured to be placed in the second stage, wherein the first cold channels and the second cold channels are connected together, wherein the first hot channels and the second hot channels are connected together, wherein forward of the first stage, the first hot channels are connected to the supply connection, wherein forward of the first stage, the first cold channels are connected to the evacuation connection, wherein the second stage has a shape of a truncated pyramid, which has a large base and a small base perpendicular to the first transfer direction and which has two sides inclined between the large base and the small base, wherein the large base constitutes a junction zone between the first stage and the second stage, wherein the small base constitutes a zone where only the second hot channels emerge and where a junction is made with the transfer connection, and wherein each side of the two sides constitutes a zone where only the second cold channels emerge and where a junction is made with one of the at least one scoop connection.

8. The propulsion system according to claim 1, wherein the heat exchanger includes a first stage and a second stage disposed aft of the first stage, wherein a plurality of first cold channels and a plurality of first hot channels are placed in the first stage, wherein a plurality of second cold channels and a plurality of second hot channels are placed in the second stage, wherein the first cold channels and the second cold channels are connected together, wherein the first hot channels and the second hot channels are connected together, wherein forward of the first stage, the first hot channels are connected to the supply connection, wherein forward of the first stage, the first cold channels are connected to the evacuation connection, wherein the second stage has a shape of a two-sided pyramid, which has a base perpendicular to the first transfer direction and two sides inclined from the base, wherein the base constitutes a junction zone between the first stage and the second stage, wherein one of the sides constitutes a zone where only the second cold channels emerge and where a junction is made with the at least one scoop connection, and wherein the other side of the two sides constitutes a zone where only the second hot channels emerge and where a junction is made with the transfer connection.

9. The propulsion system according to claim 8, comprising at an inlet of each second cold channel and at an outlet of each second hot channel, at least one deflector element.

10. An aircraft including at least one propulsion system according to claim 1.

* * * * *